United States Patent
Lim (10) Patent No.: US 9,973,598 B2
(45) Date of Patent: May 15, 2018

(54) COMMUNICATIONS DEVICE SUPPORTING DYNAMIC MODBUS PROTOCOL MAPPING

(71) Applicant: LSIS CO., LTD., Gyeonggi-do (KR)

(72) Inventor: Jae-Hwan Lim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 41 days.

(21) Appl. No.: 15/254,198

(22) Filed: Sep. 1, 2016

(65) Prior Publication Data
US 2017/0070600 A1   Mar. 9, 2017

(30) Foreign Application Priority Data
Sep. 3, 2015   (KR) .................. 10-2015-0125179

(51) Int. Cl.
*H04L 29/06*   (2006.01)

(52) U.S. Cl.
CPC .............. *H04L 69/08* (2013.01); *H04L 69/26* (2013.01)

(58) Field of Classification Search
CPC  G05B 2219/31369; H04L 2012/40228; H04L 69/08; H04L 69/26; H04L 63/0263; H04L 67/12; H04L 69/16; H04L 12/66; H04L 2012/40215; H04L 2012/4026; H04L 29/12849; H04L 61/6027; H04L 69/18; H04L 12/40169; G06F 13/385
See application file for complete search history.

(56) References Cited

U.S. PATENT DOCUMENTS

| | | | | |
|---|---|---|---|---|
| 6,434,157 | B1 * | 8/2002 | Dube' ................... | H04L 12/462 370/401 |
| 7,051,143 | B2 * | 5/2006 | White, III .......... | G05B 19/4185 709/249 |
| 8,769,106 | B2 * | 7/2014 | Sheehan ........... | H04L 29/08846 700/11 |
| 9,419,861 | B1 * | 8/2016 | Ananchaperumal .... | H04L 41/12 |
| 9,699,204 | B2 * | 7/2017 | Kim ..................... | H04L 63/1425 |
| 2003/0126222 | A1 * | 7/2003 | Peterson ............... | H04L 12/403 709/208 |
| 2004/0054829 | A1 * | 3/2004 | White, III .......... | G05B 19/4185 710/105 |
| 2004/0153594 | A1 * | 8/2004 | Rotvold ............. | G05B 19/4186 710/305 |

(Continued)

FOREIGN PATENT DOCUMENTS

WO   2014049830 A1   4/2014

OTHER PUBLICATIONS

"Modbus Mapping Assignments for Micro Motion Transmitters Instruction Manua", Micro Motion Inc., 2004.

(Continued)

*Primary Examiner* — Wutchung Chu
(74) *Attorney, Agent, or Firm* — K&L Gates LLP (57) ABSTRACT

Disclosed embodiments relate to a communications device that supports the Modbus protocol. In some embodiments, a device includes: a receiver to receive a transmit packet; a data packet extractor configured to extract a data packet from the transmit packet; a data packet analyzer configured to acquire a command indicated by the data packet based on a Modbus map that associates data included in the data packet with a handler function included in the communications device; and an action performer configured to carry out the acquired command.

5 Claims, 7 Drawing Sheets

(56) References Cited

U.S. PATENT DOCUMENTS

| | | | | |
|---|---|---|---|---|
| 2008/0235420 A1* | 9/2008 | Wei | ............ | H04L 43/10 710/110 |
| 2010/0283606 A1* | 11/2010 | Tsypin | ............ | G06Q 30/02 340/540 |
| 2011/0040809 A1* | 2/2011 | Spanier | ............ | G01D 4/004 707/821 |
| 2012/0327939 A1* | 12/2012 | Jang | ............ | H04L 12/66 370/392 |

OTHER PUBLICATIONS

Japanese office action dated Sep. 26, 2017 for corresponding JP application.

* cited by examiner

| Address | Function Code | Data | Error Check |
|---------|---------------|------|-------------|

COMMUNICATIONS DEVICE SUPPORTING DYNAMIC MODBUS PROTOCOL MAPPING

CROSS REFERENCE TO RELATED APPLICATIONS

This application claims the benefit of Korean Patent Application No. 10-2015-0125179, filed on Sep. 3, 2015, entitled "COMMUNICATIONS DEVICE SUPPORTING DYNAMIC MODBUS PROTOCOL MAPPING", which is hereby incorporated by reference in its entirety.

BACKGROUND

Technical Field

The present disclosure relates to a communications device using Modbus.

Description of the Related Art

Modbus is a serial communications protocol developed by Modicon. Specifically, Modbus is a communications protocol for transmitting information among devices connected to one another via serial lines. Modbus can also work over TCP/IP and UDP, as well as serial communications. Specifically, according to the Modbus protocol, a master device sends a request to a slave device, and a slave device sends a response to the request to the master device. A plurality of devices can exchange information thereamong via the Modbus protocol. In addition, a plurality of devices can control another device via the Modbus protocol.

SUMMARY

It is an aspect of some embodiments of the present disclosure to provide a communications device that supports a Modbus protocol, the device including: a receiver configured to receive a transmit packet; a data packet extractor configured to extract a data packet from the transmit packet; a data packet analyzer configured to acquire a command indicated by the data packet based on a Modbus map that associates data contained in the data packet with a handler function included in the communications device; and an action performer configured to carry out the acquired command.

The Modbus map may include addresses where data is stored, data types indicative of data attributes, and names indicative of the handler functions, and the device may further include: a Modbus map manager configured to manage the Modbus map and link data that associates the handler functions with the names.

The Modbus map may be created in an XML file format, and the link data may be in the form of a dynamic link library (DLL).

The Modbus manager may receive a command to change Modbus protocol mapping and may change the Modbus map and/or the link data.

The Modbus map manager may check if there is an error in the command.

The Modbus map manager may check if any handler function is associated with more than one handler function name, or vice versa, in the link data.

According to an embodiment of the present disclosure, there is provided a communications device supporting dynamic Modbus protocol mapping.

DETAILED DESCRIPTION

In the following detailed description, reference is made to the accompanying drawings that show, by way of illustration, specific embodiments in which the claimed subject matter may be practiced. These embodiments are described in sufficient detail to enable those skilled in the art to practice the subject matter. However, embodiments of the present disclosure may be modified in various different ways and are not limited to some embodiments disclosed herein. In the accompanying drawings, well-known elements include been omitted in order not to unnecessarily obscure the gist of the present disclosure. Like reference numerals designate like elements throughout the disclosure.

It is to be noticed that the term "comprising", used in the present description and claims, should not be interpreted as being restricted to the means listed thereafter; it does not exclude other elements or steps.

Hereinafter, a communications device according to an embodiment of the present disclosure will be described with reference to FIGS. 1 to 3.

Figure 1:
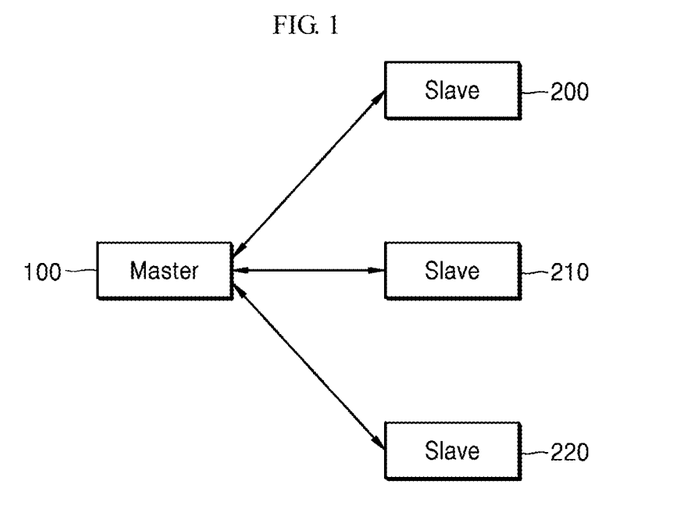
FIG. 1 is a block diagram of a communications system according to an embodiment of the present disclosure.

FIG. 1 is a block diagram of a communications system according to an embodiment of the present disclosure.

A communications system according to the Modbus protocol may include a master communications device 100 configured to transmit a request to slave communications devices 200, 210 and 220. In addition, the communications system according to the Modbus protocol may include slave communications devices 200, 210 and 220 configured to transmit responses to the request to the master communications device 100. In an embodiment of the present disclosure, a communications system according to the Modbus protocol may include a plurality of slave communications devices. A packet transmitted according to the Modbus protocol will be described with reference to FIG. 2.

Figure 2:
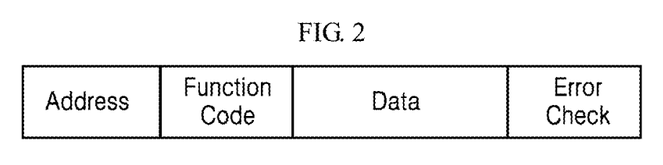
FIG. 2 is a view showing a data packet conforming to the Modbus protocol according to an embodiment of the present disclosure.

FIG. 2 is a view showing a data packet conforming to the Modbus protocol according to an embodiment of the present disclosure.

The data packet conforming to the Modbus protocol may include an address field indicative of the address of the data transmitted in the data packet, a function field indicative of the function of the data transmitted in the data packet, and a data field indicative of the data transmitted in the data packet. The address field may include the address of a slave communications device (e.g., a slave address). The function field may include a function code specifying the details of the transmitted data. In addition, the data packet may include an error check field for checking if there is data missing between transmission and reception of the data packet. The data packet may include a start field indicative of the start of the data packet, and an end field indicative of the end of the data packet. Each individual device supporting the Modbus protocol searches for a function corresponding to the address field and the function field of the data packet and executes the data contained in the data packet. This will be described in detail with reference to FIGS. 3 and 4.

Figure 3:
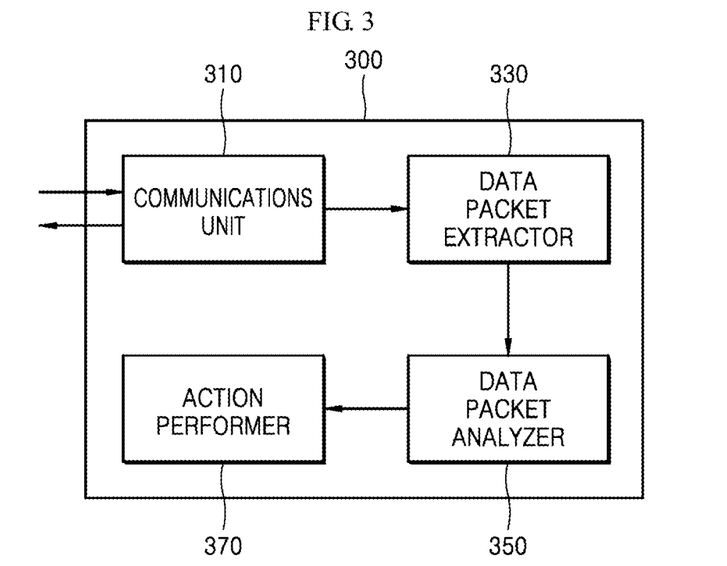
FIG. 3 is a block diagram of a communications device according to an embodiment of the present disclosure.

FIG. 3 is a block diagram of a communications device according to an embodiment of the present disclosure.

According to an embodiment of the present disclosure, a communications device 300 supporting the Modbus protocol includes a communications unit 310, a data packet extractor 330, a data packet analyzer 350, and an action performer 370. The communications device 300 may be either a master communications device or a slave communications device depending on the situation.

The communications unit 310 receives a transmit packet in which data packet is comprised from another communications device and transmits a transmit packet to another communications device. According to an embodiment of the present disclosure, the transmit packet may be a TCP/IP packet when the Modbus protocol supports the TCP/IP protocol. According to another embodiment of the present disclosure, the transmit packet may be a UDP packet when the Modbus protocol supports the UDP protocol.

The data packet extractor 330 extracts a data packet from a transmit packet.

The data packet analyzer 350 analyzes data comprised in the extracted data packet. Specifically, the data packet analyzer 350 acquires a command indicated by the data packet based on the address field, the function field and the data field of the extracted data packet. The data packet analyzer 350 may use a Modbus map that associates the address field and the function field of a data packet with a handler function included in the communications device 300. To this end, the Modbus map may include a data name indicative of what is the data, an address where the data is stored, and a data type indicative of the data attribute. Specifically, the data type may include at least one of a data size and a read/write attribute.

The action performer 370 may perform an action pursuant to the acquired command. The operation of the communications device 300 will be described in more detail with reference to FIG. 4.

Figure 4:
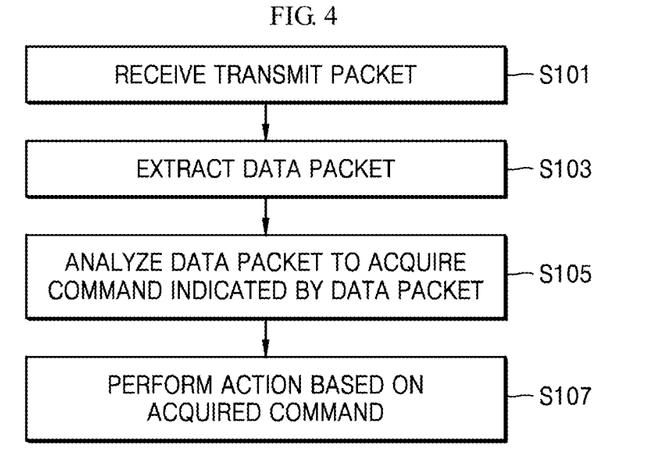
FIG. 4 is a flowchart for illustrating an operation of the communications device according to an embodiment of the present disclosure.

FIG. 4 is a flowchart for illustrating an operation of the communications device according to an embodiment of the present disclosure.

The communications unit 310 receives a transmit packet in which data packet is comprised from another communications device (step S101).

The data packet extractor 330 extracts a data packet from the transmit packet (step S103). Specifically, the data packet extractor 330 may extract the data packet from the payload field of the transmit packet.

The data packet analyzer 350 analyzes data comprised in the extracted data packet (step S105). Specifically, the data packet analyzer 350 acquires a command indicated by the data packet based on the address field, the function field and the data field of the extracted data packet. In addition, the data packet analyzer 350 acquires a command indicated by the data packet based on the start field indicative of the start of the data packet and the end field indicative of the end of the data packet. According to an embodiment of the present disclosure, the data packet analyzer 350 may determine whether the data packet has been damaged during the transmission based on an error check field comprised in the data packet. If it is determined that the data packet has been damaged, the data packet analyzer 350 may ignore the command indicated by the data packet.

In addition, the data packet analyzer 350 may acquire the command indicated by the data packet based on the data name, the address where the data is stored and the data type included in the Modbus map.

According to another embodiment of the present disclosure, the data packet analyzer 350 may check whether the data packet has been damaged during the transmission based on the error check field, and may notify a user the damaged data packet. More specifically, if it is determined that the data packet has been damaged, the data packet analyzer 350 may notify the user the data packet and the transmit packet from which the data packet is extracted.

The action performer 370 may perform an action pursuant to the acquired command (step S107).

Typically, the Modbus map is implemented as program codes using a program language. Accordingly, when the configuration of each individual device is changed or a user requests to change a function, the program codes of the Modbus map have to be changed and compiled again, to be installed in the device, which is cumbersome. Accordingly, what is required is a communications device capable of dynamically changing the Modbus map. This will be described in detail with reference to FIGS. 5 and 6.

Figure 5:
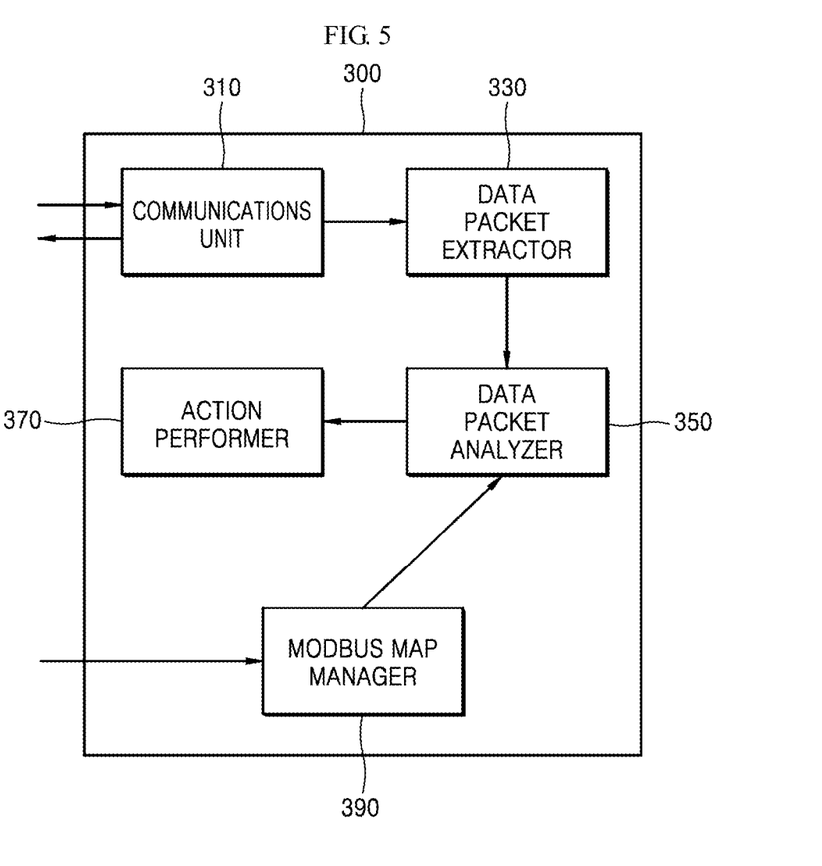
FIG. 5 is a block diagram of a communications device according to still another embodiment of the present disclosure.

FIG. 5 is a block diagram of a communications device according to still another embodiment of the present disclosure.

According to the embodiment shown in FIG. 5, the communications device 300 further includes a Modbus map manager 390, in addition to the elements shown in FIG. 3.

The Modbus map manager 390 manages a Modbus map 391 and link data 393. Specifically, the Modbus map manager 390 may receive an input to change Modbus protocol mapping and may change the Modbus protocol mapping. Specifically, the Modbus map manager 390 may change the Modbus protocol mapping by using the Modbus map including the Modbus addresses where the data is stored, the data types and the handler function names, and the link data associating the handler function names with the handler function included in the communications device 300. This will be described in detail with reference to FIG. 6.

Figure 6:
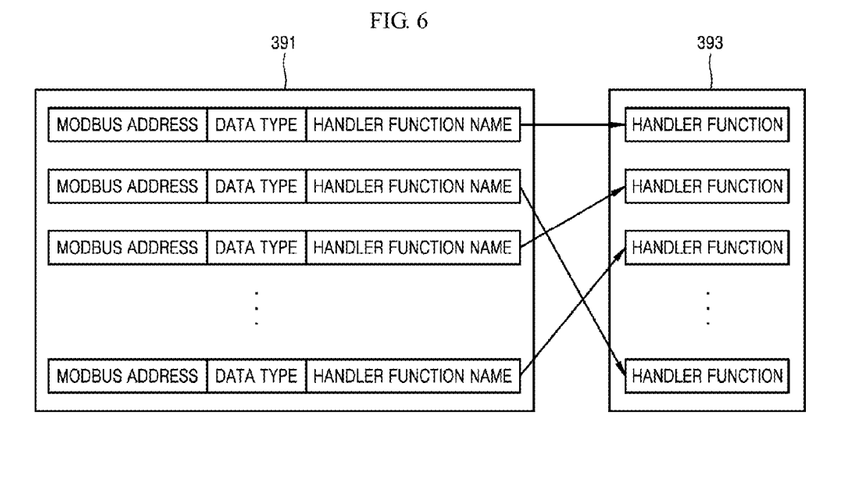
FIG. 6 is a view showing a Modbus map and link data for the Modbus protocol mapping according to yet another embodiment of the present disclosure.

FIG. 6 is a view showing a Modbus map and link data for the Modbus protocol mapping according to yet another embodiment of the present disclosure.

As described above, the Modbus map 391 may include Modbus addresses where data is stored, data types, and handler function names. The data types may indicate read/write attributes of data. In addition, the data types may indicate data sizes. The Modbus map 391 may be in an XML file format. The link data 393 associates a handler function name with a handler function actually included in the communications device 300. Specifically, the link data 393 may associate a handler function name with the address of a register indicating a handler function actually included in the communications device 300. Specifically, the link data may be in the form of a dynamic link library (DLL). When it is desired to change the address of the Modbus protocol, the data type and the handler function name, the communications device 300 may change the Modbus map 391. In addition, if there is any change in the handler function of the communications device 300, the link data 393 may be changed. The operation of the Modbus map manager 390 will be described in more detail with reference to FIG. 7.

Figure 7:
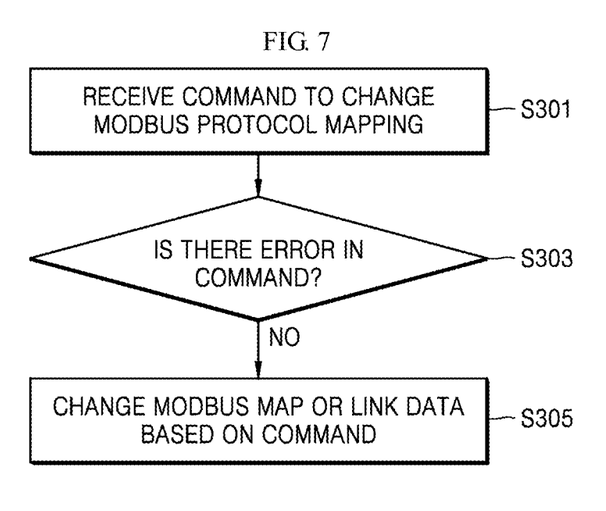
FIG. 7 is a flowchart for illustrating a process of changing the Modbus map by the communications device according to still another embodiment of the present disclosure.

FIG. 7 is a flowchart for illustrating a process of changing the Modbus map by the communications device according to still another embodiment of the present disclosure.

The Modbus map manager 390 receives a command to change the Modbus protocol mapping (step S301).

The Modbus map manager 390 determines whether there is an error in the command to change the Modbus protocol mapping (step S303). Specifically, the Modbus map manager 390 may determine whether the Modbus address, which the command is directed to, exists in the Modbus map 391. According to another embodiment, the Modbus map manager 390 may determine whether the hander function name, which the command is directed to, exists in the Modbus map 391. According to yet another embodiment, the Modbus map manager 390 may determine whether any handler function is associated with more than one handler function name or vice versa in the link data. According to an embodiment of the present disclosure, if there is an error in the command to change the Modbus protocol mapping, the Modbus map manager 390 may notify a user of it. By doing so, the communications device 300 may prevent that the Modbus protocol mapping is erroneously changed.

The Modbus map manager 390 changes the Modbus map 391 and/or the link data 393 based on the command to change the Modbus mapping (step S305). When it is desired to change the address of the Modbus protocol, the data type and the handler function name, the Modbus manager 390 may change the Modbus map 391. In addition, if there is any change in the handler function of the communications device 300, the Modbus manager 390 may change the link data 393.

According to an embodiment of the present disclosure, the communications device 300 may receive the changed Modbus protocol map and/or link data, instead of receiving the command to change the Modbus protocol mapping.

By doing so, the communications device 300 may not require additional compiling even when the Modbus protocol mapping is changed. Accordingly, the Modbus protocol mapping can be more easily changed for a plurality of devices all together.

References to "one embodiment" or "an embodiment" do not necessarily refer to the same embodiment, although they may. Further, a particular feature, structure, effect in an embodiment may be practiced in other embodiments by combining or modifying them by those skilled in the art. Accordingly, it is to be understood that such combinations and modifications also fall within the scope of the present disclosure.

Although the embodiments of the present disclosure have been disclosed for illustrative purposes, those skilled in the art would appreciate that various modifications and substitutions may be made without departing from the scope and spirit of the disclosure. For example, elements of the embodiment of the present disclosure may be modified. Such modifications and substitutions are also construed as falling within the scope of the present disclosure as defined by the appended claims. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A communications device that supports a Modbus protocol, the device comprising:
    a processor;
    a receiver, which when executed by the processor, receives a transmit packet;
    a data packet extractor, which when executed by the processor, extracts a data packet from the transmit packet;
    a data packet analyzer, which when executed by the processor, determines a command indicated by the data packet based on a Modbus map that associates data included in the data packet with handler functions included in the communications device;
    an action performer, which when executed by the processor, performs the acquired command; and
    a Modbus map manager, which when executed by the processor, manages the Modbus map and link data that is separate from the Modbus map,
    wherein the Modbus map comprises addresses where the data is stored, data types indicative of data attributes of the data included in the data packet, and handler function names indicative of the handler functions,
    wherein the link data associates the handler function names with addresses of registers indicating the handler functions included in the communications device.

2. The communications device of claim 1, wherein the Modbus map is created in an Extensible Markup Language (XML) file format, and
    wherein the link data is in the form of a dynamic link library (DLL).

3. The communications device of claim 1, wherein the Modbus map manager is further configured to receive a command to change Modbus protocol mapping and change the Modbus map and/or the link data.

4. The communications device of claim 3, wherein the Modbus map manager is further configured to check if there is an error in the command.

5. A communications device that supports a Modbus protocol, the device comprising:
    a processor;
    a receiver, which when executed by the processor, receives a transmit packet;
    a data packet extractor, which when executed by the processor, extracts a data packet from the transmit packet;
    a data packet analyzer, which when executed by the processor, determines a command indicated by the data packet, based on a Modbus map that associates data included in the data packet with handler functions included in the communications device;
    an action performer, which when executed by the processor, performs the acquired command; and
    a Modbus map manager, which when executed by the processor, manages the Modbus map and link data that associates the handler functions with handler function names,
    wherein the Modbus map comprises addresses where data is stored, data types indicative of data attributes, and the handler function names indicative of the handler functions, wherein the Modbus map manager is further configured to receive a command to change a Modbus protocol mapping, check if a handler function is associated with more than one handler function name in the link data, check if a handler function name is associated with one handler function in the link data, and change the Modbus map and/or the link data.

* * * * *